United States Patent
Wang et al.

(10) Patent No.: US 12,411,046 B2
(45) Date of Patent: Sep. 9, 2025

(54) CHOPPED PASSIVE INFRARED SENSOR APPARATUS AND METHOD FOR STATIONARY AND MOVING OCCUPANT DETECTION

(71) Applicant: THE RESEARCH FOUNDATION FOR THE STATE UNIVERSITY OF NEW YORK, Albany, NY (US)

(72) Inventors: Ya Wang, Albany, NY (US); Haili Liu, Albany, NY (US); Kevin Wang, Albany, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 0 days.

(21) Appl. No.: 16/475,444

(22) PCT Filed: Jan. 11, 2018

(86) PCT No.: PCT/US2018/013281
§ 371 (c)(1),
(2) Date: Jul. 2, 2019

(87) PCT Pub. No.: WO2018/132546
PCT Pub. Date: Jul. 19, 2018

(65) Prior Publication Data
US 2019/0323897 A1    Oct. 24, 2019

Related U.S. Application Data

(60) Provisional application No. 62/446,047, filed on Jan. 13, 2017.

(51) Int. Cl.
*G01J 5/00* (2006.01)
*G01J 5/0805* (2022.01)
*G01J 5/34* (2022.01)

(52) U.S. Cl.
CPC .......... *G01J 5/0805* (2022.01); *G01J 5/0025* (2013.01); *G01J 5/34* (2013.01)

(58) Field of Classification Search
None
See application file for complete search history.

(56) References Cited

U.S. PATENT DOCUMENTS

| 4,072,863 A | 2/1978 | Roundy |
| 4,501,967 A | 2/1985 | Shaulov |

(Continued)

FOREIGN PATENT DOCUMENTS

| CN | 1115028 | 1/1996 |
| CN | 1091913 | 10/2002 |

(Continued)

OTHER PUBLICATIONS

International Search Report dated Mar. 28, 2018 issued in PCT/US2018/013281.

(Continued)

*Primary Examiner* — Hoon K Song
(74) *Attorney, Agent, or Firm* — Lance D. Reich; Peter Fallon (57) ABSTRACT

A chopped PIR (C-PIR) sensor is capable of detecting both stationary and moving objects with a high degree of accuracy using a narrow infrared semi-transparent chopper to temporally shutter incident radiation received by pyroelectric sensing elements. Demonstrating a field of view of 110° (horizontal) and 90° (vertical), the C-PIR sensor can detect stationary objects located within 4 m of the sensor, and moving objects located within 8 m of the sensor with 100% accuracy.

19 Claims, 8 Drawing Sheets

(56) References Cited

U.S. PATENT DOCUMENTS

| | | | |
|---|---|---|---|
| 4,907,895 A | 3/1990 | Everest | |
| 5,512,748 A | 4/1996 | Hanson | |
| 5,528,038 A | 6/1996 | Yoshiike et al. | |
| 5,712,622 A | 1/1998 | Grossinger et al. | |
| 5,860,741 A | 1/1999 | Tsao et al. | |
| 6,037,594 A | 3/2000 | Claytor et al. | |
| 6,762,676 B2 | 7/2004 | Teowee et al. | |
| 7,026,602 B2 | 4/2006 | Dausch | |
| 7,626,170 B2 | 12/2009 | Harding et al. | |
| 7,875,853 B2 | 1/2011 | Edwards | |
| 7,921,480 B2 | 4/2011 | Parsons et al. | |
| 8,556,043 B2 | 10/2013 | Mangini et al. | |
| 9,116,037 B2 | 8/2015 | Claytor | |
| 9,885,608 B2 | 2/2018 | Claytor | |
| 10,054,608 B2 | 8/2018 | Goldenson et al. | |
| 2001/0013831 A1 | 8/2001 | Harling et al. | |
| 2005/0146065 A1* | 7/2005 | Cochran | B29C 49/78 264/40.6 |
| 2009/0219539 A1* | 9/2009 | Myrick | G01N 21/31 356/445 |
| 2011/0038626 A1* | 2/2011 | Lim | G03B 9/08 396/468 |
| 2011/0267473 A1 | 11/2011 | Kabasawa et al. | |
| 2012/0018256 A1* | 1/2012 | Mangini | B66B 5/0043 187/247 |
| 2013/0144563 A1 | 6/2013 | Naumann et al. | |
| 2016/0138976 A1 | 5/2016 | Schilz et al. | |
| 2019/0323897 A1 | 10/2019 | Wang et al. | |
| 2020/0134996 A1* | 4/2020 | Siminoff | G08B 13/19684 |
| 2021/0333152 A1 | 10/2021 | Hiremath et al. | |

FOREIGN PATENT DOCUMENTS

| | | |
|---|---|---|
| CN | 210741679 | 6/2020 |
| CN | 111919095 | 11/2020 |
| DE | 3045203 | 6/1981 |
| DE | 3622371 A1 | 2/1988 |
| DE | 4292011 | 7/1993 |
| DE | 69828288 | 9/2005 |
| EP | 0224595 | 10/1989 |
| EP | 0450063 | 10/1991 |
| EP | 0384409 | 10/1994 |
| EP | 0838670 | 4/1998 |
| EP | 0825572 B1 | 7/2003 |
| EP | 1002425 | 12/2004 |
| GB | 2489218 | 9/2012 |
| JP | S64-75838 A | 3/1989 |
| JP | H0511464 | 2/1993 |
| JP | H0688748 | 3/1994 |
| JP | H07120318 | 5/1995 |
| JP | H07174633 | 7/1995 |
| JP | H07198609 | 8/1995 |
| JP | H07260582 | 10/1995 |
| JP | 3018222 | 11/1995 |
| JP | H07301568 | 11/1995 |
| JP | H087096 | 1/1996 |
| JP | H0843542 | 2/1996 |
| JP | H0850060 | 2/1996 |
| JP | H0854281 | 2/1996 |
| JP | H0862342 | 3/1996 |
| JP | H08145789 | 6/1996 |
| JP | H08178747 | 7/1996 |
| JP | H08193886 | 7/1996 |
| JP | H08261833 | 10/1996 |
| JP | H08292103 | 11/1996 |
| JP | H08313339 | 11/1996 |
| JP | H08313359 | 11/1996 |
| JP | H095156 | 1/1997 |
| JP | H09101204 | 4/1997 |
| JP | H09196764 | 7/1997 |
| JP | H09210773 | 8/1997 |
| JP | H09297057 | 11/1997 |
| JP | H09-318440 A | 12/1997 |
| JP | H09318440 | 12/1997 |
| JP | H1019667 | 1/1998 |
| JP | H1062243 | 3/1998 |
| JP | H10104080 | 4/1998 |
| JP | H10104085 | 4/1998 |
| JP | H10142046 | 5/1998 |
| JP | 2791417 | 8/1998 |
| JP | H10227697 | 8/1998 |
| JP | H10227699 | 8/1998 |
| JP | H1151773 | 2/1999 |
| JP | 2000131138 | 5/2000 |
| JP | 2000230899 | 8/2000 |
| JP | 2000241241 | 9/2000 |
| JP | 3127285 | 1/2001 |
| JP | 3075505 | 2/2001 |
| JP | 2001074550 | 3/2001 |
| JP | 2001124864 | 5/2001 |
| JP | 2001518182 | 10/2001 |
| JP | 3293350 | 6/2002 |
| JP | 2002267535 | 9/2002 |
| JP | 2007501410 | 1/2007 |
| JP | 2007178301 | 7/2007 |
| JP | 2010079829 | 4/2010 |
| JP | 2013-083521 A | 5/2013 |
| JP | 2013083521 | 5/2013 |
| JP | 2013524178 | 6/2013 |
| JP | 5513797 | 6/2014 |
| JP | 2017138305 | 8/2017 |
| JP | 6420877 | 11/2018 |
| KR | 970010976 | 7/1997 |
| KR | 0133150 | 4/1998 |
| KR | 0141447 | 7/1998 |
| KR | 19980076239 | 11/1998 |
| KR | 0151302 | 12/1998 |
| KR | 0166870 | 3/1999 |
| KR | 200238887 | 10/2001 |
| KR | 20020084566 | 11/2002 |
| KR | 100404743 | 11/2003 |
| KR | 200415824 | 5/2006 |
| KR | 100705709 | 4/2007 |
| KR | 20100030687 | 3/2010 |
| KR | 100952398 | 4/2010 |
| KR | 20120046081 | 5/2012 |
| KR | 20130016323 | 2/2013 |
| KR | 20210136983 | 11/2021 |
| WO | 1999008442 | 2/1999 |
| WO | WO 2011/059830 A2 | 5/2011 |

OTHER PUBLICATIONS

Xu, Shaoqiu, et al., Non-intrusive activity assessment of a vulnerable individual for real living environments, Meas. Sci. Technol., 19 (2008) 045208 (9pp).

* cited by examiner

CHOPPED PASSIVE INFRARED SENSOR APPARATUS AND METHOD FOR STATIONARY AND MOVING OCCUPANT DETECTION

CROSS-REFERENCE TO RELATED APPLICATIONS

This application claims the benefit of U.S. Provisional Application No. 62/446,047 filed on Jan. 13, 2017, the entire contents of which are incorporated herein by reference.

GOVERNMENT LICENSE RIGHTS

This invention was made with government support under grant number AR0000531 awarded by the Department of Energy. The government has certain rights in the invention.

BACKGROUND

The present disclosure relates generally to infrared detectors, and more specifically to passive infrared (IR) detectors and their methods of use in the detection of long infrared radiation (i.e., 8-15 microns). The human body radiates most at a wavelength of about 10 microns.

Passive infrared (PIR) occupancy sensors are used in a variety of applications, including motion detection, tracking, personal identification, and the automated control of lighting systems as well as heating, ventilation, and air conditioning (HVAC) systems. As will be appreciated by those skilled in the art, the sensing principle of such devices is based on the pyroelectric effect, which relates to the ability of certain materials to generate a temporary voltage as they are heated or cooled.

In a pyroelectric material, a change in temperature modifies the positions of the atoms slightly within the crystal structure, such that the polarization of the material changes. However, because the voltage generated by pyroelectric materials occurs in response to fluxuations of radiated heat, conventional PIR sensors that are adept at detecting moving objects are unable to detect stationary objects.

Further example detectors include thermopile sensors, which are based on the Seebeck effect, and can measure the temperature of both moving and stationary objects. However, thermopile sensors are not practical solutions for occupancy detection due to their short sensing distance, narrow field of view and relatively high cost of manufacture.

SUMMARY

In view of the foregoing, notwithstanding recent developments, there is a need for improved infrared sensing technology, including the ability to sense stationary as well as moving objects. Also beneficial would be the ability to distinguish human from non-human occupants.

Thus, in accordance with various embodiments, the functionality of PIR sensors is expanded to include stationary object detection. The methods and apparatus described herein relate to a PIR-based occupancy sensor that includes a sensing element and a Fresnel lens disposed over a surface of the sensing element, and further includes an optical chopper disposed in front of the sensing element. The sensor may further include applicable sensing and control circuitry.

The disclosed chopped PIR (C-PIR) sensor is capable of detecting both stationary and moving occupants utilizing, according to certain embodiments, a semi-transparent infrared chopper that is adapted to periodically shutter radiation incident on the sensing element. The chopper is adapted to move (e.g., oscillate) back and forth in front of the sensor during operation of the sensor to create relative motion between the sensing element and a target object. This perceived relative motion, in conjunction with supporting circuitry, enables the detection of objects that are themselves stationary.

Advantageously, a non-linear vibrating chopper may be integrated with one or more PIR sensing elements and a suitable Fresnel lens without increasing the footprint of the device relative to traditional sensors, which facilitates their incorporation into conventional systems.

Moreover, while the semi-transparent chopper can efficiently shutter unidirectional infrared (IR) power that is radiated by stationary occupants, it has a negligible influence on the omnidirectional power radiated from the ambient environment. Therefore, a voltage difference generated by the C-PIR sensor between occupied and unoccupied scenarios can be used to identify the presence of stationary occupants with a high degree of accuracy. For moving occupant detection, the chopper can minimally affect the variation of radiated power, and thus lead to comparable detection accuracy.

Applicant has developed a theoretical model that describes the physics and dynamics of IR radiation that is temporally shuttered by the chopper. Parametric studies, experimental characterization, and empirical analysis are used to obtain chopper settings appropriate for a given application, including the chopper thickness and oscillation frequency.

Experimental results reveal that the C-PIR sensor can detect stationary occupants at distances up to 4 m, and moving occupants at distances up to 8 m, while maintaining a detection accuracy of 100%. The field of view of the C-PIR sensor was measured to be 110° (horizontal) and 90° (vertical), which provides a wide viewing angle.

In accordance with embodiments of the present application, a pyroelectric IR sensor includes a pyroelectric sensing element for detecting infrared radiation emitted from an object, a Fresnel lens disposed over a surface of the pyroelectric sensing element, and an optical chopper for intermittently intercepting the infrared radiation from being incident onto said pyroelectric sensing element.

A method of detecting an occupant using a pyroelectric IR sensor includes collecting infrared radiation using a pyroelectric sensing element, wherein prior to the infrared radiation being incident upon a surface of the pyroelectric sensing element the infrared radiation passes through a Fresnel lens and an optical chopper.

BRIEF DESCRIPTION OF SEVERAL VIEWS OF THE DRAWINGS

The following detailed description of specific embodiments of the present application can be best understood when read in conjunction with the following drawings, where like structure is indicated with like reference numerals and in which.

DETAILED DESCRIPTION

Reference will now be made in greater detail to various embodiments of the subject matter of the present application, some embodiments of which are illustrated in the accompanying drawings. The same reference numerals will be used throughout the drawings to refer to the same or similar parts.

Figure 1:
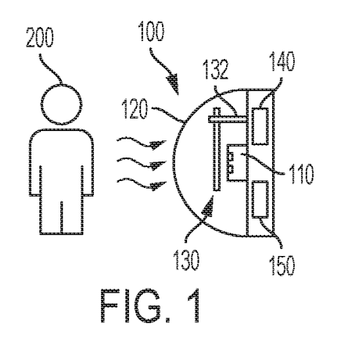
FIG. 1 is a schematic diagram of an infrared (PIR) sensor including an optical chopper according to various embodiments.

Referring to FIG. 1, an infrared sensor 100 according to various embodiments includes a pyroelectric sensing element 110, a Fresnel lens 120 disposed over the sensing element 110, and an optical chopper 130 disposed between the pyroelectric sensing element 110 and the Fresnel lens 120. Although a single sensing element 110 is shown, plural sensing elements may be used in conjunction with various embodiments.

The sensing element 110 may include any suitable material that exhibits a pyroelectric response. Example materials include lithium niobat LiNbO$_3$) and lithium tantalate (LiTaO$_3$), which in crystalline form may be spontaneously polarized such that electric dipoles develop within the crystal structure. Heating a LiNbO$_3$ or LiTaO$_3$ crystal, for example, to a temperature just below its Curie temperature in an electrical field will cause these dipoles to align with the electrical field.

Fresnel lens 120 is configured to concentrate a source of electromagnetic radiation (e.g., infrared radiation) into a defined beam, i.e., as a condensing lens, which enables the sensing element 110 to sample radiation from a wide viewing area. The Fresnel lens 120 is positioned over a surface of the sensing element 110, between the sensing element and object 200. In certain embodiments, the Fresnel lens 120 may be spaced away from the surface of the sensing element.

The chopper 130, which is also located between the sensing element 110 and object 200, i.e., a source of infrared radiation, is configured to partially and periodically shutter the radiant power emitted from the object 200 and received by the sensing element 110. As used herein, a "chopper" or an "optical chopper" refers to a device that periodically interrupts a beam of electromagnetic radiation.

In certain embodiments, the chopper 130 may be located between the Fresnel lens 120 and the object 200 or, as in the illustrated embodiment, the chopper 130 may be located between the Fresnel lens 120 and the sensing element 110. The chopper 130 is configured to only partially attenuate radiation emitted by the object and incident on the sensing element 110.

A semi-transparent optical chopper 130 may be made from polyethylene or polypropylene plastic, for example. For instance, a high density polyethylene (HDPE) plastic may be used as the chopper material due to its long wavelength IR transmission bandwidth, i.e., over the range of 8 to 15 μm. In example embodiments, the transmission of infrared radiation through the semi-transparent chopper may range from 20 to 80%, e.g., 20, 30, 40, 50, 60, 70 or 80%, including ranges between any of the foregoing values. The semi-transparency of the chopper 130 eliminates the occurrence of a fully-attenuated signal, which beneficially impacts the detection range of the sensor 100.

The dimensions of the chopper are not particularly limited. The chopper thickness may range from 0.25 to 0.5 mm, e.g., 0.25, 0.3, 0.35, 0.4, 0.45 or 0.5 mm, including ranges between any of the foregoing values. In certain embodiments, the sensor response is proportional to the width of the chopper, which may range from 1 to 10 mm, e.g., 1, 2, 4, 6, 8 or 10 mm, including ranges between any of the foregoing values. The effect of the width of the chopper (0.36 mm thick polypropylene) on output voltage is summarized in Table 1.

TABLE 1

| Width of chopper (mm) | ΔV (V) |
| --- | --- |
| 1 | 0.360 |
| 2 | 0.560 |
| 3 | 0.640 |
| 4 | 0.800 |
| 5 | 0.880 |
| 6 | 0.960 |
| 7 | 1.280 |

In certain embodiments, the non-linear chopper 130 is composed of a cantilever beam having a tip magnet. A pair of external magnets located on opposite sides of the cantilever beam and an external excitation coil are adapted to interact with the tip magnet and oscillate the cantilever.

Referring still to FIG. 1, the sensor 100 may further include a drive element 140 and an amplifying control circuit 150. As described in further detail here, the drive element 140 and associated circuitry is configured to control movement, e.g., periodic oscillation or rotation of the chopper 130. In certain embodiments, a servo motor and an Arduino Uno MCU may be used to drive the chopper 130. By way of example, a servo motor can be programmed to rotate the optical chopper at 3.75 rpm, such that the motor and chopper makes a 180° rotation in 8 seconds.

During operation of the sensor 100, when a target area is unoccupied, omnidirectional power radiated from the ambient can bypass the chopper. When occupied, the radiated heat emitted by the occupant 200 can be completely chopped in one direction, which, in turn, will produce a measureable output voltage, indicating the presence of the occupant, whether the occupant is in motion or not.

In certain embodiments, the sensor is adapted to detect long wavelength infrared radiation, such as radiation emitted by the human body. As used herein "long wavelength infrared radiation" refers to electromagnetic radiation having a wavelength of 8 to 15 microns, e.g., 8, 10, 12 or 15 microns, including ranges between any of the foregoing values.

Figure 2:
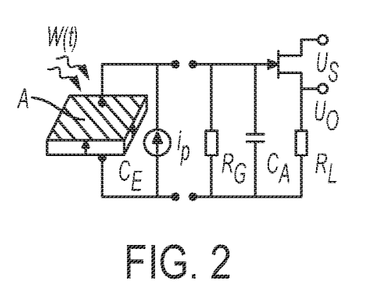
FIG. 2 depicts the irradiation of a single sensing element by a heat source and an associated circuit for measuring a voltage output from the sensing element.

With reference to FIG. 2, the output voltage response ($R_U$) of an irradiated sensing element 110, that is, the output voltage $U_0$ per Watt of input power $W_0$, can be expressed as $$R_U = \frac{U_o}{W_o} = \frac{S_{const}\,\omega}{(1+\omega^2\tau_T^2)^{1/2}(1+\omega^2\tau_E^2)^{1/2}},$$

where $\omega$ is the angular frequency of the radiated power, $\tau_T$ and $\tau_E$ are the thermal and electrical time constants, respectively, and $S_{const} = AR_G \eta P \perp / G_T$ is a constant associated with a particular C-PIR sensor, where $A = l_e w_e$ is the sensing area, $R_G$ is the resistance of the gate, $\eta$ is the emissivity of the pyroelectric element, $p \perp$ is the normal direction pyroelectric coefficient, and $G_T$ is the thermal conductance to the ambient.

In FIG. 2, $R_L$ is the resistance of the gate and the load, $C_E$ and $C_A$ represent the capacitance of the pyroelectric sensing element 110 and the amplifier 150, respectively, $i_p$ is the current output of the sensing element 110, and $U_S$ is the supply voltage.

Figure 3:
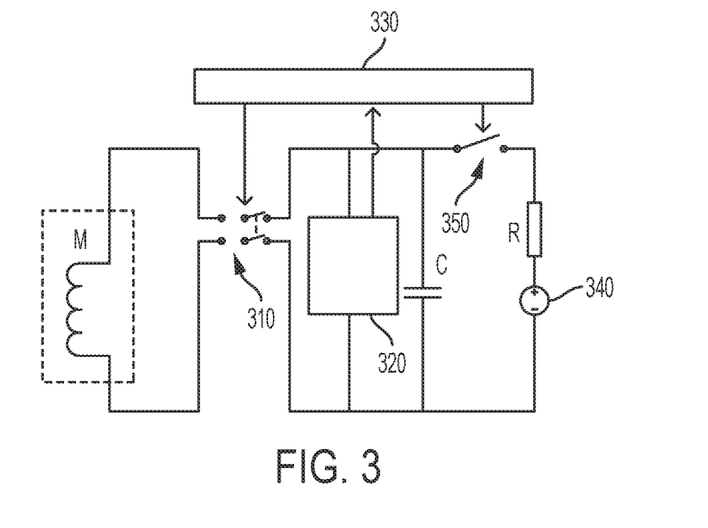
FIG. 3 is a block diagram of a driving circuit for oscillating an optical chopper according to various embodiments.

In certain embodiments, the chopper is driven by a coil-magnet couple. A block diagram of an example driving circuit is shown in FIG. 3. The driving circuit controls the current through the coils M. The capacitor C and the coils M constitute an LC oscillating circuit when the driving switch 310 is turned ON. The detector and comparator 320 sense the voltage extreme point across the capacitor C, and output a signal to the controller 330. The DC power source 340 supplements the power delivered to the capacitor C when the power switch 350 is turned ON and the driving switch 310 is turned OFF. Using information from the detector/comparator 320, the controller 330 controls actuation of the driving switch 310 and the power switch 350.

In an example method, the capacitor C is initially fully charged. Then, the driving switch 310 is turned ON so that the LC oscillating circuit generates an electromagnetic force to drive the chopper 130 across the pyroelectric sensing element 110. The voltage across the capacitor C is then inverted by the LC oscillating circuit.

When the voltage reaches a maximum, a trigger signal is sent to the controller 330 by the detector/comparator 320. The controller 330 turns the driving switch 310 OFF until the chopper 130 reaches its destination. In certain embodiments, the chopper 130 may be stationary for some time while the driving switch 310 is OFF.

The driving switch 310 is then turned ON to cycle the chopper 130 back. The current flows back and the voltage across the capacitor C is inverted. The capacitor recovers its original polarization when the voltage across the capacitor is inverted twice. The controller 330 then turns the driving switch 310 OFF after the voltage reaches a maximum.

While the two cycles may consume energy, which decreases the voltage across the capacitor, at this point the power switch 350 can be turned ON to charge the capacitor. After the capacitor is fully charged, a new cycle can be initiated.

As describe above, the optical chopper may be physically translated (e.g., oscillated) back and forth in order to temporally interrupt the flux of IR radiation received by the sensing element. In further embodiments, a solid state optical chopper may remain stationary and the IR transmittance of the optical chopper may vary as a function of time. For instance, an optical chopper may include an electrochromic coating that may be biased with a suitable voltage to control the IR transmission therethrough. As will be appreciated, a chopped sensor may be implemented in a variety of configurations.

Figure 4:
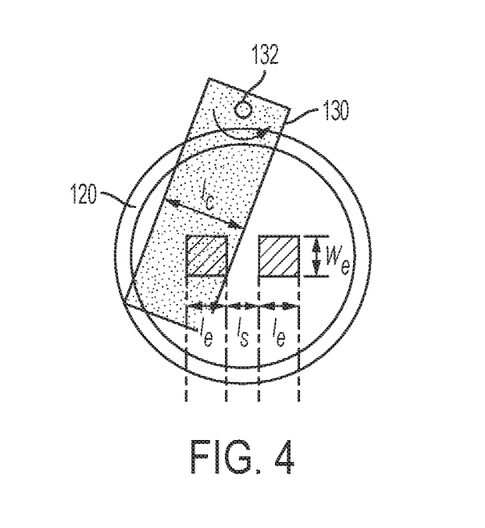
FIG. 4 is a top view of a PIR sensor showing the location of the optical chopper and dual sensing elements.
Figure 5:
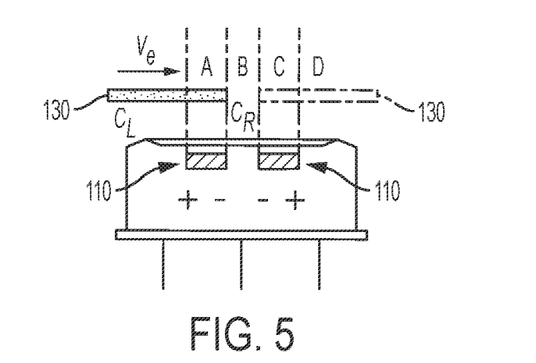
FIG. 5 is a side view of the PIR sensor of FIG. 4 showing the location and range of motion of the optical chopper with respect to the dual sensing elements.

According to further embodiments, and as shown in FIG. 4 and FIG. 5, which are a top-down plan view and a corresponding lateral view, respectively, a C-PIR sensor 100 includes: dual sensing elements 110, a Fresnel lens 120 arranged peripheral to the sensing elements, a semi-transparent chopper 130 having a drive element 140, and an amplifier/microcontroller unit (MCU) 150. In the illustrated embodiment, the dual sensing elements 110 are connected in series with opposite polarity. The optical chopper 130 is mounted on a pivot 132 and is configured to oscillate in front of the sensing elements.

With particular reference to FIG. 5, the trajectory of the oscillating chopper 130 over one chopping period ($t_{LD}$–$t_{RA}$) is shown schematically. The positions $t_{RA}$, $t_{RB}$, $t_{RC}$, $t_{RD}$, $t_{LA}$, $t_{LB}$, $t_{LC}$ and $t_{LD}$ indicate the time instant when the chopper left and right edges ($C_L$ and $C_R$) arrive at positions A, B, C and D. The two illustrated positions of the chopper 130 represent the two positions where sensing elements 110 are completely, but independently covered. In certain embodiments, the areal dimensions of the chopper may be greater than the areal dimensions of the underlying sensing element, such that the sensing element will be entirely overshadowed by the chopper for a finite time during operation of the sensor. By partially and intermittently attenuating the radiated heat receiving by the sensing elements 110, stationary occupants 200 can be detected.

Figure 6:
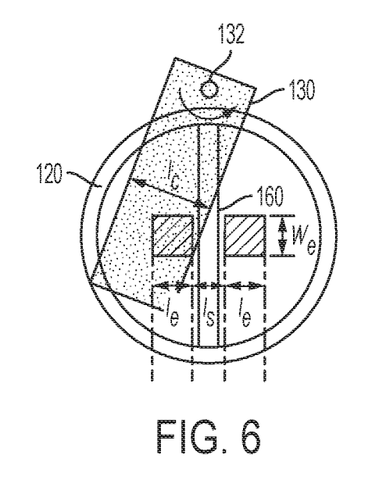
FIG. 6 is a schematic diagram of a chopped infrared sensor including two pyroelectric sensing elements separated by an opaque wall according to further embodiments.

A further C-PIR sensor configuration is shown in FIG. 6. The sensor includes two pyroelectric elements 110, an overlying Fresnel lens 120, and a semi-transparent chopper 130 mounted on a pivot 132 along the midline between the sensing elements. The Fresnel lens 120 is divided into two regions, and a barrier 160 opaque to IR radiation is positioned between the pyroelectric elements, e.g., along the midline.

During operation, the combination of sensors may be used to detect occupancy over a broad field of view, where the sensing area is divided into two regions. Furthermore, the incorporation of plural, e.g., two or more, sensing elements 110 into the sensor can improve detection precision. The sensor-generated voltage can be used to indicate the presence or absence of an object within the sensor's field of view.

Without wishing to be bound by theory, if the radiated power density from an occupant is defined as $\Phi_h$ (power per unit area) and the transmittance of the chopper is defined as $\kappa_{ch}$, the power received by the two sensing elements W(t) during one chopping period ($t_{LD}$–$t_{RA}$) can be represented by the following piecewise function:

$$W(t) = \Phi_h w_e[2l_e - v_c t(1-\kappa_{ch})]; \quad t_{RA} \leq t < t_{RB}$$

$$W(t) = \Phi_h w_e l_e(1+\kappa_{ch}); \quad t_{RB} \leq t > t_{RC}$$

$$W(t) = \Phi_h w_e[2l_c + (l_s - v_c t)(1-\kappa_{ch})]; \quad t_{RC} \leq t \leq t_{RD}$$

$$W(t) = 2\Phi_h w_e l_e \kappa_{ch}; \quad t_{RD} \leq t < t_{LA}$$

$$W(t) = \Phi_h w_e[(l-\kappa_{ch})(v_c t - l_c) + 2l_e \kappa_{ch}]; \quad t_{LA} \leq t < t_{LB}$$

Figure 7:
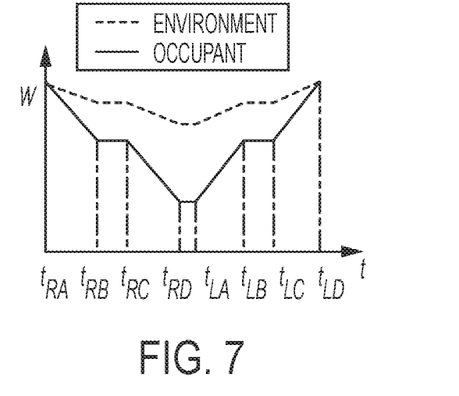
FIG. 7 is a plot showing the variation of radiated power on dual sensing elements.

$W(t) = \Phi_h w_e l_e [l+\kappa_{ch}]; \quad t_{LB} \leq t < t_{LC}$ $W(t) = \Phi_h w_e [(l-\kappa_{ch})(v_c t - l_c - l_s) + 2l_e \kappa_{ch}]; \quad t_{LC} \leq t < t_{Ld}.$ In the foregoing equations, $l_c$ represents the width of the chopper, $l_e$ and $w_e$ represent the length and width of a sensing element 110, respectively, $l_s$ is the space between the two sensing elements, and $v_c$ represents the velocity of the chopper 130. The ideal waveform of W(t) for each chopping period is shown as a solid line in FIG. 7.

As noted previously, only the variation of incident power (radiation) on a pyroelectric sensing element can induce an output voltage change. The variation of incident power, $\Delta W(t)$, can be represented as a sinusoidal function with a period $T = t_{LD} - t_{RA}$ and an amplitude equal to $\Phi_h w_e l_e (1-\kappa_{ch})$, such that $\Delta W(t) = \Phi_h w_e l_e (1-\kappa_{ch}) \sin[(2\pi t)/T]$. In an unoccupied environment, $\Delta W(t)$ radiated from the ambient is typically small, as illustrated by the dashed line in FIG. 7.

Figure 8:
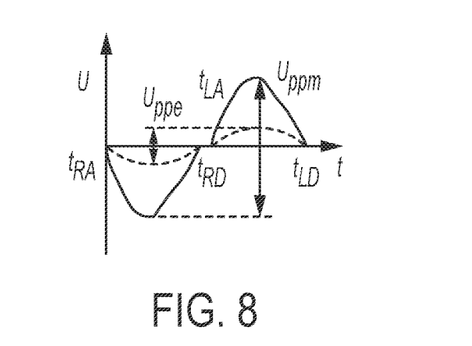
FIG. 8 depicts the time-varying output voltage from dual pyroelectric sensing elements.

Referring to FIG. 8, shown is a graph of voltage output corresponding to $\Delta W(t)$ as a function of time, i.e., as a function of chopping period. The peak-to-peak (P-P) voltage value $U_{ppe}$ induced by ambient radiation defines a background condition. During operation, a peak-to-peak value $U_{ppm}$ from the C-PIR sensor may be compared with $U_{ppc}$. In an example method, if $(U_{ppm} - U_{ppe}) > U_{th}$, where $U_{th}$ is a threshold detection value, a moving or stationary occupant is detected. If, on the other hand, $(U_{ppm} - U_{ppe}) \leq U_{th}$, an unoccupied scenario is indicated.

The variation of incident power, $\Delta W(t)$, suggests that the transmittance and the chopping speed may affect the radiated power and thus have an effect on sensing performance. Therefore, a parametric study may be used to identify suitable values.

Figure 9:
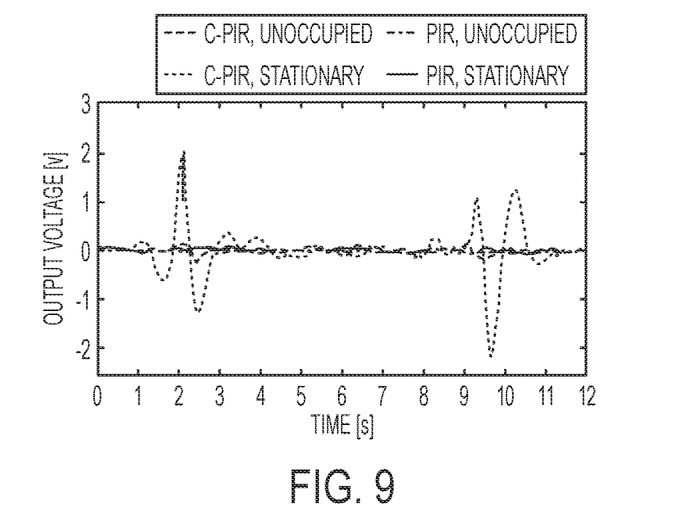
FIG. 9 is a plot comparing peak-to-peak voltage versus time for conventional and chopped PIR sensors for unoccupied and occupied environments.

In an example evaluation, a 1 mm thick, 2 mm wide chopper is chosen, which is wider than the associated sensing element array. For an occupant with a skin temperature of 36° C. seated in front of the C-PIR sensor, the output voltage waveform is shown in FIG. 9, and may be characterized by two peak variations at opposite flow directions across two chopping periods. The results confirm the chopping principle shown in FIGS. 4 and 5, where a maximum voltage is realized when either of the sensing elements 110 is completely overshadowed by the moving, semi-transparent chopper.

FIG. 9 also shows that the peak-to-peak voltage value for a C-PIR sensor in an unoccupied environment ($U_{ppe} = 0.4$ V) is higher than that of its conventional PIR counterpart (0.12 V). With the occupant stationary at a distance of 1 m, the signal for the C-PIR sensor increases significantly ($U_{ppm} = 4.6$ V), while almost no change is measured for the conventional sensor (0.12 V).

Figure 10:
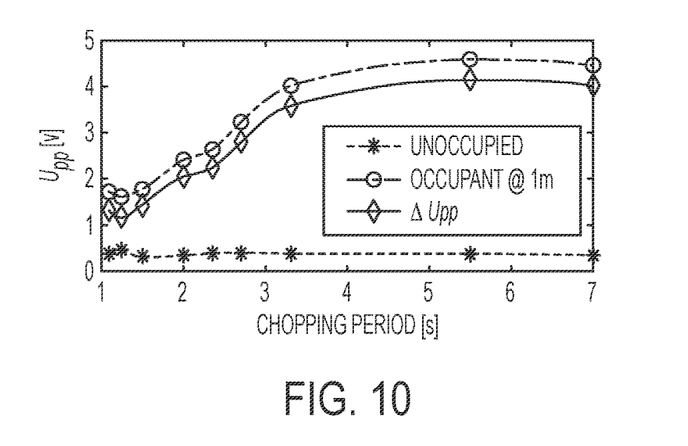
FIG. 10 is a plot of voltage versus chopping period for unoccupied and occupied environments.

Referring to FIG. 10, it is observed that $U_{ppm}$ varies significantly with varying chopping period, suggesting that the chopping frequency may be selected for a specific sensor. In certain embodiments, the PIR sensor has a time delay of less than 15 seconds, e.g., 4, 8, 12 or 15 seconds, including ranges between any of the foregoing values. As used herein, "time delay" is the time between the moment when the sensor is first triggered and when the sensor can be triggered again.

Figure 11:
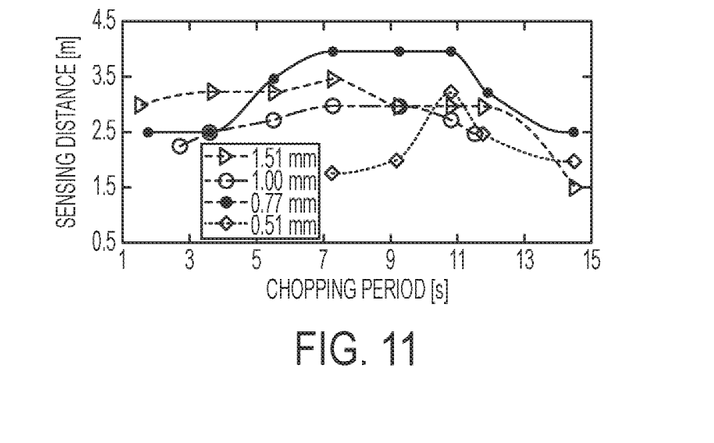
FIG. 11 is a plot of sensing distance versus chopping period for an exemplary C-PIR sensor.

Referring to FIG. 11, sensing test results are shown for choppers having four different thicknesses (1.51 mm, 1 mm, 0.77 mm, and 0.51 mm) at an ambient temperature of 21.7° C. and different chopping speeds. It will be appreciated that $U_{ppe}$ varies with the chopper thickness and the chopping speed.

In accordance with the instant embodiment, an ambient-dependent threshold value is pre-defined as $U_{th} = \max$ (1.6*$U_{ppe}$, $U_{ppe} + 0.2$ V). The results (FIG. 11) indicate the existence of a maximum detection range at different chopping periods, where the three thicker choppers exhibit essentially invariant profiles as a function of chopping period, indicating a wider range of their optimal chopping speeds. For instance, the sensor having the 0.77 mm thick chopping element exhibits a detection range of 4 m over a chopping period ranging from 7 to 11 s.

Figure 12:
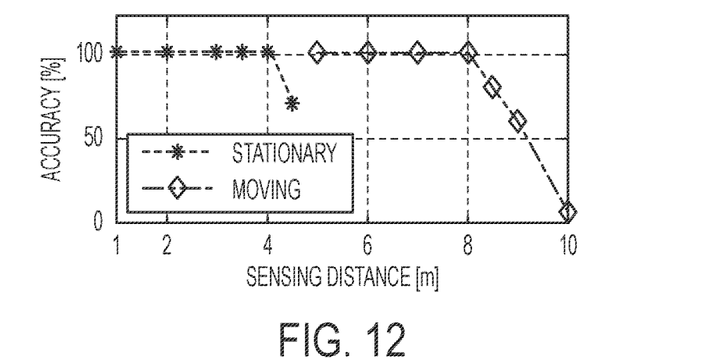
FIG. 12 is a plot of sensing accuracy versus sensing distance for stationary and moving objects.

Referring to FIG. 12, sensing accuracy data is plotted for the C-PIR sensor having a 0.7 mm thick chopping element, evaluated at a chopping period of 7.5 s for both stationary and moving occupants. The evaluation was conducted over two days at an ambient temperature varying from 24.9° C. to 25.5° C. with $U_{th} = 1.6*U_{ppe} = 0.64$ V.

For stationary occupancy detection and an occupant located at a distance of 1, 2, 3, 3.5, 4 or 4.5 m from the C-PIR, 20 datasets were collected for each distance. A sensing accuracy of 100% is obtained for a range of up to 4 m (100 datasets). At a distance of 4.5 m, however, the accuracy drops to 65%. In certain embodiments, for stationary occupancy detection, a detection accuracy of 95% or greater, e.g., 95, 96, 97, 98, 99 or 100%, including ranges between any of the foregoing values, can be achieved over a sensing distance of up to 4 m, e.g., 1, 2, 3 or 4 m, including ranges between any of the foregoing values, over a field of view of up to 110°, e.g., 45, 60, 90, 100 or 110°, including ranges between any of the foregoing values.

For moving occupancy detection, the same occupant walked randomly at a speed of about 0.5 m/s at a distance from the C-PIR sensor of 5, 6, 7, 8, 8.5, 9 or 10 m. The C-PIR sensor maintains an accuracy of 100% for a range of up to 8 m (80 datasets). The accuracy drops to 75% (or less) for distances of 8.5 m and beyond. In certain embodiments, for moving occupancy detection, a detection accuracy of 95% or greater, e.g., 95, 96, 97, 98, 99 or 100%, including ranges between any of the foregoing values, can be achieved over a sensing distance of up to 8 m, e.g., 1, 2, 3, 4, 5, 6, 7, or 8 m, including ranges between any of the foregoing values, over a field of view of up to 110°, e.g., 45, 60, 90, 100 or 110°, including ranges between any of the foregoing values.

Figure 13:
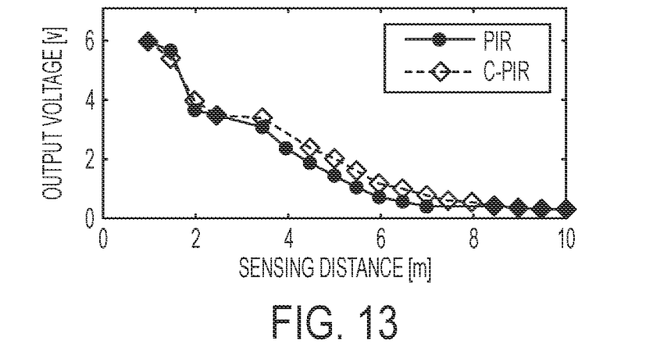
FIG. 13 is a plot of output voltage versus sensing distance for a moving object.

A plot of peak-to-peak voltages from the C-PIR sensor over different detection ranges is shown in FIG. 13, along with comparative data from a counterpart PIR sensor, indicating that both the C-PIR and PIR sensors produce similar output voltage for moving occupancy detection.

Figure 14:
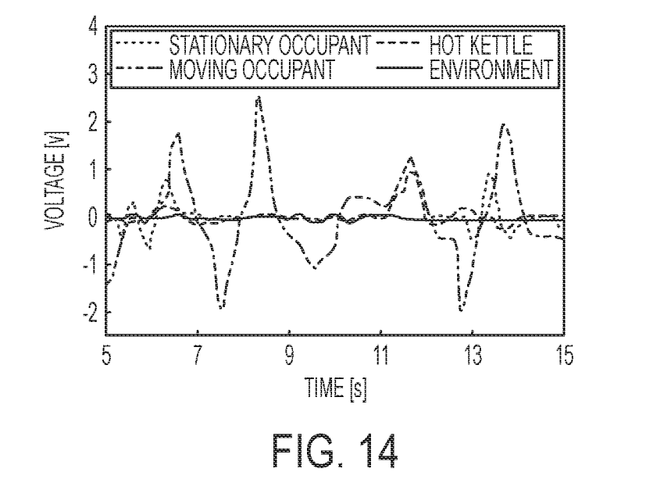
FIG. 14 is a plot of voltage versus time for various radiation-emitting objects.

Referring to FIG. 14, shown are the voltage waveforms of the C-PIR sensor under four scenarios, which are (i) stationary occupant located at a distance of 2.5 m, (ii) moving occupant located at a distance of 2.5, (iii) hot (96.2° C.) kettle located at a distance of 2.25 m, and (iv) environmental baseline. Because the hot kettle cannot induce a voltage greater than $U_{th} = 0.64$ V at a distance of 2.5 m, the kettle is located at 2.25 m for comparison.

Figure 15:
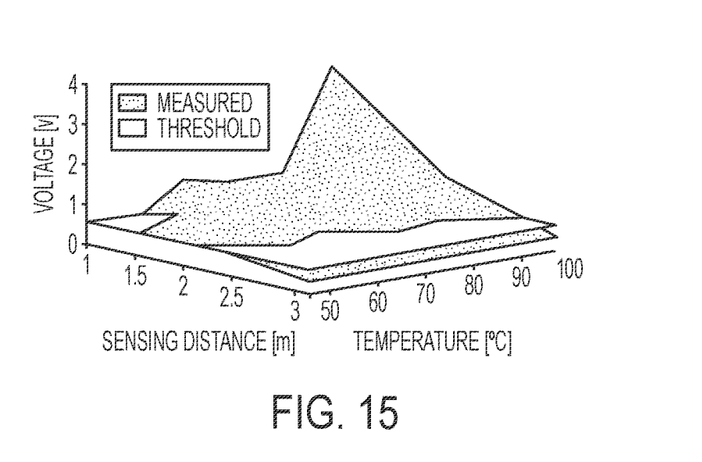
FIG. 15 is a plot of output voltage for an inanimate object heated to different temperatures and located at different distances from an exemplary C-PIR sensor.

Referring to FIG. 15, plotted is the output voltage from the C-PIR sensor for a stationary kettle of different temperatures that is placed at different distances. The threshold of V=0.64V is annotated. It will be appreciated from the data that a hot kettle (or other small heat source) located at a distance of 2.5 m or greater from the C-PIR sensor will not trigger the sensor, and thus can be distinguished from a human occupant at these distances.

In a further test using an analog sensor and a servo motor to move the chopper, it was determined that the sensor output can be modeled as a sinusoidal wave with oscillations between 0 and 5V. Experiments with the analog sensor compared the voltage output of three stationary objects: a hot kettle (85° C.), one occupant, and two occupants. A control voltage reading was taken in each experiment. The voltage data are summarized in Table 2.

TABLE 2

| Distance (m) | Kettle (85° C.) ΔV (V) | One Occupant ΔV (V) | Two Occupants ΔV (V) |
| --- | --- | --- | --- |
| Control | 1.24 | 1.08 | 1.08 |
| 1 | 4.84 | 4.96 | 4.36 |
| 2 | 4.40 | 4.96 | 4.96 |
| 3 | 4.52 | 4.24 | 4.32 |
| 4 | 3.08 | 4.24 | 4.32 |
| 5 | 1.32 | 3.36 | 3.48 |
| 6 | 1.12 | 2.24 | 1.24 |

Embodiments of the apparatus and method described herein are configured to detect both moving and stationary objects as well as distinguish between human and non-human occupants. Using several pyroelectric elements, the disclosed sensors can locate and track mobile occupants. An exemplary sensing apparatus includes the features of passive and active sensing, as well as a long sensing distance, wide field of view and low cost. The apparatus and methods described herein can be used with systems including, but not limited to, HVAC, lighting, security, and robot navigation.

As used herein, the singular forms "a," "an" and "the" include plural referents unless the context clearly dictates otherwise. Thus, for example, reference to a "sensor" includes examples having two or more such "sensors" unless the context clearly indicates otherwise.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It will be understood that when an element such as a layer, region or substrate is referred to as being formed on, deposited on, or disposed "on" or "over" another element, it can be directly on the other element or intervening elements may also be present. In contrast, when an element is referred to as being "directly on" or "directly over" another element, no intervening elements are present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an optical chopper that comprises polypropylene include embodiments where an optical chopper consists essentially of polypropylene and embodiments where an optical chopper consists of polypropylene.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A pyroelectric IR sensor comprising:
    a first pyroelectric sensing element for detecting infrared radiation emitted from an object;
    a Fresnel lens disposed over a surface of the pyroelectric sensing element; and
    an optical chopper for intermittently intercepting the infrared radiation from being incident onto said first pyroelectric sensing element, the optical chopper disposed between the sensing element and the Fresnel lens.

2. The sensor of claim 1, wherein the Fresnel lens is spaced away from the surface of the sensing element.

3. The sensor of claim 1, wherein the optical chopper is semi-transparent to long wavelength infrared radiation.

4. The sensor of claim 1, wherein a length of the optical chopper is greater than a length of the sensing element and a width of the optical chopper is greater than a width of the sensing element.

5. The sensor of claim 1, further comprising a second pyroelectric sensing element.

6. The sensor of claim 5, wherein a barrier opaque to IR radiation is disposed between the first pyroelectric sensing element and the second pyroelectric sensing element.

7. The sensor of claim 5, wherein the optical chopper is configured to intermittently intercept the infrared radiation from being incident onto said second pyroelectric sensing element.

8. A method of detecting an occupant using a pyroelectric IR sensor comprising:
    collecting infrared radiation using a first pyroelectric sensing element, wherein prior to the infrared radiation being incident upon a surface of the first pyroelectric sensing element the infrared radiation passes through a Fresnel lens and an optical chopper,
    wherein the infrared radiation passes through the Fresnel lens prior to passing through the optical chopper.

9. The method of claim 8, wherein the infrared radiation passes through the optical chopper prior to passing through the Fresnel lens.

10. The method of claim 8, wherein the optical chopper is semi-transparent to long wavelength infrared radiation.

11. The method of claim 8, wherein the IR transmittance of the optical chopper varies as a function of time.

12. The method of claim 8, wherein the sensing element generates a voltage from the collected infrared radiation and the generated voltage is compared to a threshold detection value.

13. The method of claim 8, further comprising collecting the infrared radiation using a second pyroelectric sensing element.

14. The method of claim 8, wherein the pyroelectric IR sensor detects a stationary occupant with at least 95% accuracy at a sensing distance of up to 4 m.

15. The method of claim 8, wherein the pyroelectric IR sensor detects a moving occupant with at least 95% accuracy at a sensing distance of up to 8 m.

16. A pyroelectric IR sensor comprising:
    a first pyroelectric sensing element for detecting infrared radiation emitted from an object;
    a second pyroelectric sensing element positioned adjacent the first pyroelectric sensing element, the second pyroelectric sensing element detecting the infrared radiation emitted from the object;

a Fresnel lens disposed over the first pyroelectric sensing element and the second pyroelectric sensing element; and an optical chopper positioned between and substantially separating the first pyroelectric sensing element and the second pyroelectric sensing element and the Fresnel lens, the optical chopper including:
- a first end mounted on a pivot, and
- a second end formed opposite the first end, the second end positioned adjacent to the first pyroelectric sensing element and the second pyroelectric sensing element, wherein the optical chopper is configured to oscillate the second end between covering the first pyroelectric sensing element and the second pyroelectric sensing element to intermittently intercepting the infrared radiation from being incident onto the first pyroelectric sensing element or the second pyroelectric sensing element, and wherein the optical chopper includes at least one of a length or a width that prevents both the first pyroelectric sensing element and the second pyroelectric sensing element from being completely covered simultaneously during the oscillation.

17. The sensor of claim 1, wherein the optical chopper includes:
  a body including:
    a first end mounted on a pivot; and
    a second end formed opposite the first end, the second end positioned adjacent to the first pyroelectric sensing element.

18. The sensor of claim 17, wherein the optical chopper further includes a tip magnet positioned on the second end.

19. The sensor of claim 17, wherein the body of the optical chopper is non-linear.

* * * * *